Figure 1:
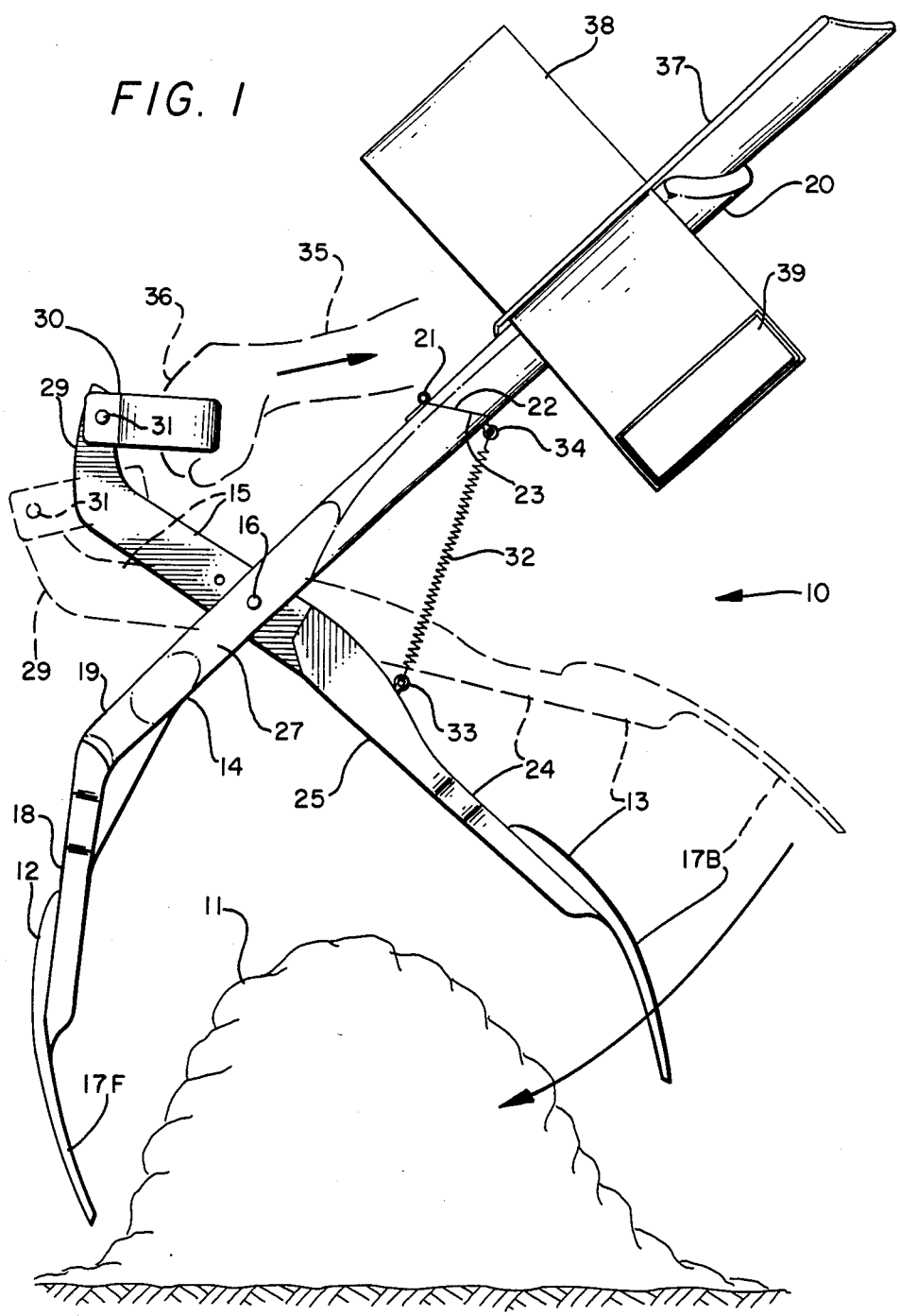

United States Patent [19]

Sample

[11] Patent Number: 4,730,864
[45] Date of Patent: Mar. 15, 1988

[54] ARM MOUNTED HAND OPERATED LEAF AND TRASH GRABBER

[76] Inventor: Tommy G. Sample, 1414 W. Illinois, Dallas, Tex. 75224

[21] Appl. No.: 17,570

[22] Filed: Feb. 24, 1987

[51] Int. Cl.⁴ ............................................. A01D 7/10
[52] U.S. Cl. ................................. 294/50.9; 294/1.1; 294/50.8; 56/400.12
[58] Field of Search ................... 294/50.9, 50.8, 50.6, 294/19.1, 1.1; 15/104.8, 257.2, 257.6, 257.7; 56/400.12, 400.11, 400.16, 400.04, 400.01

[56] References Cited

U.S. PATENT DOCUMENTS

| | | | |
|---|---|---|---|
| 966,197 | 8/1910 | Green | 294/50.9 |
| 1,160,282 | 11/1915 | Harris et al. | 294/50.9 |
| 1,939,475 | 12/1933 | Walsh | 294/50.9 |
| 2,546,113 | 3/1951 | Spang | 294/1.1 |
| 3,105,348 | 10/1963 | Vosbikian et al. | 56/400.12 |
| 3,809,421 | 5/1974 | James | 294/50.8 |
| 4,037,397 | 7/1977 | Fiorentino | 294/50.8 |
| 4,185,448 | 1/1980 | Bianco | 56/400.12 |
| 4,477,114 | 10/1984 | Callis | 294/50.8 |

*Primary Examiner*—James B. Marbert
*Attorney, Agent, or Firm*—Warren H. Kintzinger

[57] ABSTRACT

A trash and leaf gathering and pick up tool having two rake like gathering heads pivotally interconnected to close and open toward and away from each other in a jaw like action. One of the rake like gathering heads has a handle adapted to fit a user's arm and is equipped with an arm band for mounting of the tool on an arm. The other rake like gathering head has a handle extending through the pivot interconnect with the handle mountable on an arm to a hand grip equipped end positioned for being grasped by the hand of the arm mounting the tool whereby the tool is manually manipulated in its closing leaf and trash grasping action and jaw opening manipulation to dump trash.

12 Claims, 3 Drawing Figures

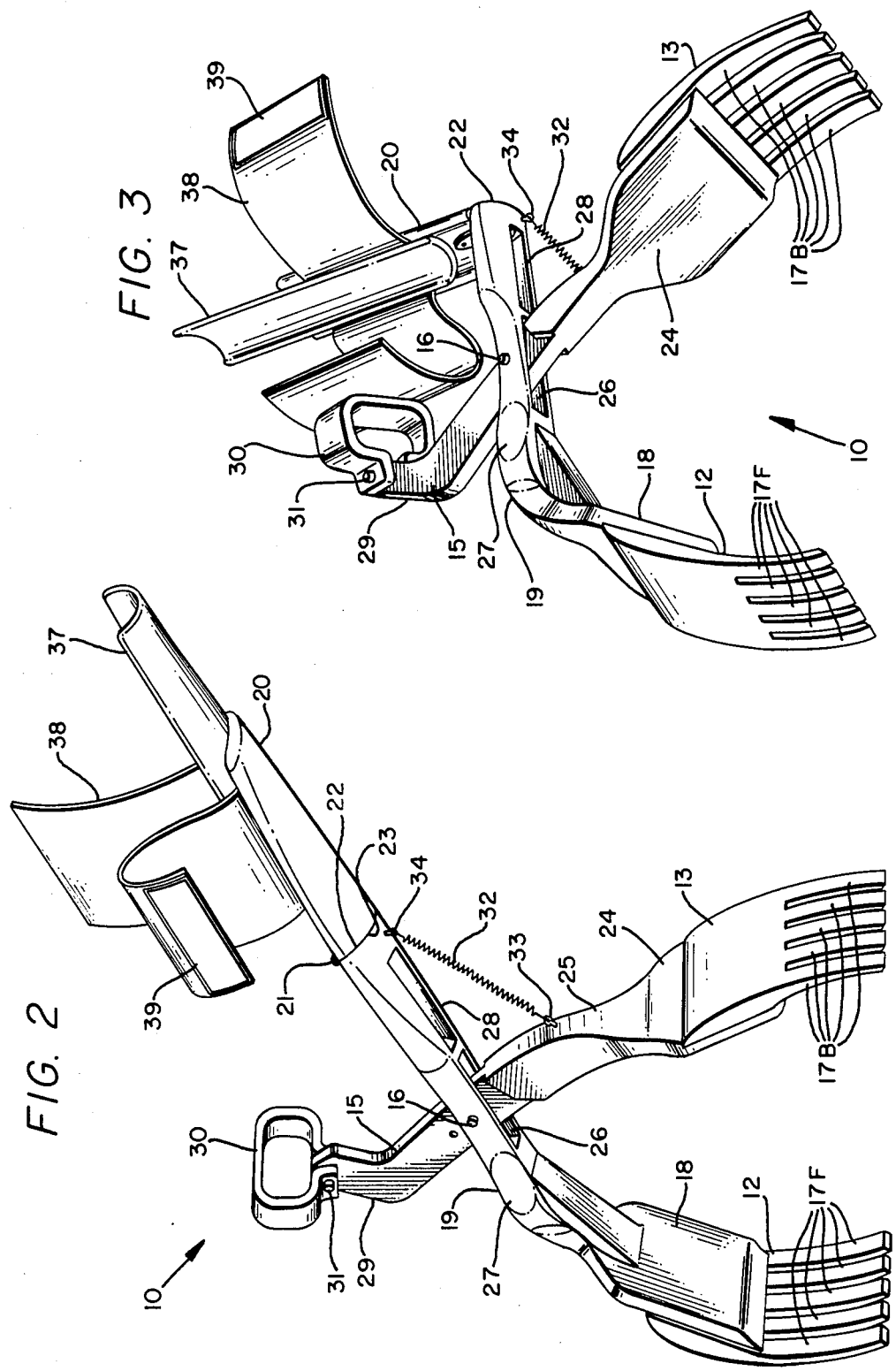

ARM MOUNTED HAND OPERATED LEAF AND TRASH GRABBER

This invention relates to leaf and debris gathering, and more particularly, to an arm mounted hand operated leaf and trash grabber.

Most conventional rakes are useful for raking leaves and trash together in piles but do not have much if any leaf and trash lifting capabilities. Some jaw operating pick up devices have been provided that, in various configurations, have provided some trash pick up capabilities but generally are difficult and awkward to use and generally require both hands of a user. Many people after leaves and trash are raked into piles pick them up by hand with this, however, being very tedious work with stooping over and lifting piles of trash and carrying them in the arms. This can be a very dirty job and at times one is exposed to a lot of filth such as pet droppings and rotted vegatation.

It is, therefore, a principal object of this invention to make leaf and trash pick up gathering easier and less tiring.

Another object is to provide a leaf and trash grabber that makes trash pick up gathering a cleaner more tasteful task.

A further object is to make trash pick up gathering a quicker operation.

Still another object is to provide such a leaf and trash grabber mounted on a user's arm operable with that arm and the hand of that arm.

Features of the invention useful in accomplishing the above objects include, in an arm mounted and hand operated leaf and trash grabber, a tool having two rake like gathering heads pivotally interconnected to close and open toward and away from each other in a jaw like action. One of the rake like gathering heads has a handle adapted to underlie an upper arm portion and having an arm band that wraps around the arm held in place with a cloth fastener such as "Velcro" to mount the tool on an arm. The other rake like gathering head has a handle extended through the pivot interconnect with the handle mountable on an arm to a hand grip equipped end positioned to be reached by the forearm of the arm mounting the tool and being grasped by the hand of that arm whereby the tool is manually manipulated in its closing leaf and trash grasping action and jaw opening manipulation to dump trash.

A specific embodiment representing what is presently regarded as the best mode of carrying out the invention is illustrated in the accompanying drawings.

In the drawings:

FIG. 1 represents a side elevation view of the arm mounted hand operated leaf and trash grabber as it would be maniuplated for picking up a pile of leaves and/or trash;

FIG. 2, an arm mounting end perspective of the leaf and trash grabber of FIG. 1; and, FIG. 3, a front-side perspective of the leaf and trash grabber of FIGS. 1 and 2.

Referring to the drawings:

The leaf and trash grabber 10 of FIGS. 1-3 that also transports and dumps collected leaves and trash 11 where desired is shown to have a forward rake like gathering head 12 and a rear rake like gathering head 13. The heads 12 and 13 have rearwardly and upwardly extended handles (or arms) 14 and 15 that are pivotally interconnected by pivot and mount pin 16. The forward rake like gathering head 12 or front fork with tines 17F extending downward from head top 18 is rigidly connected to handle 14 front portion 19. A rear portion 20 of handle 14 has a top hinge 21 connection with front portion 19 above abutting ends 22 and 23, respectively, that are at a slant for enhanced support in the working state. When the tool is to be stored when not in use the handle rear portion 20 may be folded over as shown in FIG. 3 for compactness in storage. The rear rake like gathering head 13 or back fork with tines 17B extending downward from head top 24 is rigidly connected to handle 15 bottom 25. The handle 15 extends upwardly from bottom 25 through slot 26 in the front portion 19 of handle 15 between opposite slot sides 27 and 28 that mount pivot pin 16 that also extends through the handle 15 of back fork head 13. Handle 15 extends on up from the pivot pin 16 mounting to a top end 29 to which hand grip 30 is pivotally mounted by pivot pin 31. The leaf and trash grabber 10 is resiliently biased to the open state, shown in phantom in FIG. 1, by a tension coil spring 32 connected between an eye connector 33 on the back of handle 15 bottom 25 and eye connector 34 on the bottom of handle 14 front portion 19. However, the leaf and trash grabber 10 may be pulled to the closed leaf and trash 11 grasping state by pulling of hand grip 30 to the rear by the arm 35 and hand 36 of the user. The arm 35 rests on an arm trough portion 37 of handle rear portion 20 where it is held in place by an arm band 38 fastened to the handle portion 20 that wraps around the arm 35 and held in place with a cloth fastener 39 such as "Velcro" in mounting of the tool 10 on an arm 35.

It should be noted that the downward extended tines 17F and 17B of both said forward and rear gathering heads 12 and 13 are vertically inwardly curved one facing the other for enhanced debris holding characteristics.

Whereas this invention has been described primarily with respect to a single embodiment thereof, it should be realized that various changes may be made without departure from the essential contributions to the art made by the teachings hereof.

I claim:

1. An arm mounted hand operated debris gathering tool comprising: a forward gathering head with downward extended tines; a rear gathering head with downward extended tines; first handle means extended upward and to the rear from said forward gathering head; second handle means extended upward from said rear gathering head; pivot interconnect means interconnecting said first handle means and said second handle means for pivotal movement of said forward and rear gathering heads toward and away from each other; said first handle means having a rear portion holding fastening means for mounting of said first handle means and the tool on the arm of a user; and hand hold means on said second handle means positioned to be grasped by the hand of the user's arm fastened to said first handle means for manipulative movement of said forward and rear gathering heads toward and away from each other in grasping and releasing debris.

2. The arm mounted hand operated debris gathering tool of claim 1, wherein one of said first and second handle means includes a slot and the other of said first and second handle means extends through the slot; and said pivot interconnect means extends through one of said first and second handle means and into the other.

3. The arm mounted hand operated debris gathering tool of claim 2, wherein resilient spring means is connected between said first and second handle means to resiliently bias said forward and rear gathering heads away from each other.

4. The arm mounted hand operated debris gathering tool of claim 3, wherein said resilient spring means is a tension spring connected to the back of the bottom end of said second handle means and to the bottom of said first handle means.

5. The arm mounted hand operated debris gathering tool of claim 2, wherein one of said first and second handle means is materially longer than the other of said first and second handle means.

6. The arm mounted hand operated debris gathering tool of claim 5, wherein the longer of said first and second handle means is said first handle means.

7. The arm mounted hand operated debris gathering tool of claim 6, wherein said first handle means has a user's arm engaging portion; and an arm band mounted on said first handle means for wrapping a user's arm to said user's arm engaging portion of said first handle means.

8. The arm mounted hand operated debris gathering tool of claim 7, wherein said arm band is fastened to said user's arm engaging portion of said arm band includes a cloth fastener to hold said arm band in place around a user's arm.

9. The arm mounted hand operated debris gathering tool of claim 8, wherein said user's arm engaging portion is trough shaped for receiving a user's arm thereon; and with the trough shaped arm engaging portion on the upper side of said first handle means.

10. The arm mounted hand operated debris gathering tool of claim 9, wherein said first handle means having a front portion and a rear portion interconnected by hinge means whereby said first handle means may be folded as an aid to tool storage when not in use.

11. The arm mounted hand operated debris gathering tool of claim 8, wherein said hand hold means is a hand grip pivotally mounted on the top of said second handle means.

12. The arm mounted hand operated debris gathering tool of claim 8, wherein the downward extended tines of both said forward and rear gathering heads are vertically inwardly curved one facing the other for enhanced debris holding chararacteristics.

* * * * *